J. F. WATERS.
FOOD PRODUCT.
APPLICATION FILED JAN. 5, 1920.

1,381,526.

Patented June 14, 1921.

Witness:
A. J. Sauser.

Inventor:
John F. Waters
By Fred Gerlach
his Atty.

UNITED STATES PATENT OFFICE.

JOHN F. WATERS, OF CHICAGO, ILLINOIS.

FOOD PRODUCT.

1,381,526.

Specification of Letters Patent.  Patented June 14, 1921.

Application filed January 5, 1920. Serial No. 349,385.

*To all whom it may concern:*

Be it known that I, JOHN F. WATERS, a citizen of the United States, and a resident of Chicago, in the county of Cook and State of Illinois, have invented certain new and useful Improvements in Food Products, of which the following is a full, clear, and exact description.

The invention relates to food products and more particularly to an improved roll of beef and method of making the same.

It is now common practice to use the small tenderloins of beef, those ranging from 1¼ to 2 pounds, with common cuts in canned products or in sausage, because they are too small for individual roasting.

The object of the present invention is to provide an improved roll of small beef tenderloins and method of making the same, into a delicious and delectable beef roast which will be substantially uniform in quality from end to end and so that the slices therefrom will be of uniform quality.

The invention consists in the several novel features hereinafter set forth and more particularly defined by claims at the conclusion hereof.

Figure 1:
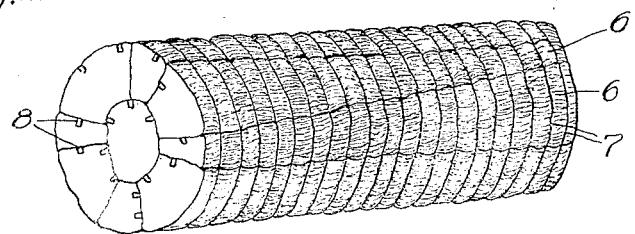
Figure 2:
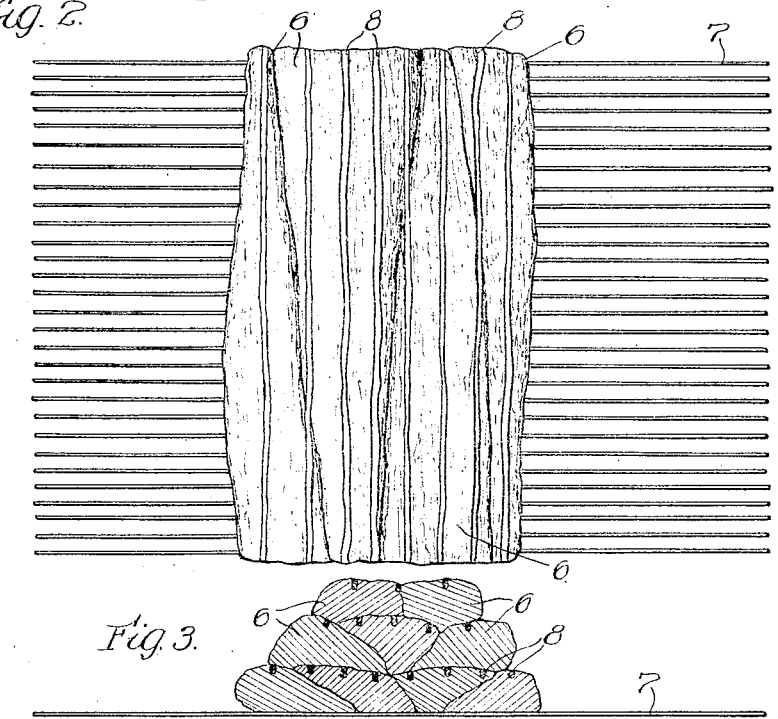
Figure 3:
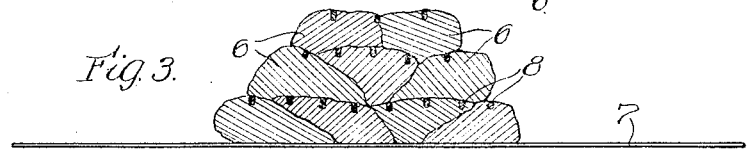
Figure 4:
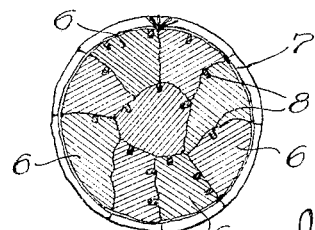

In the drawings: Figure 1 is a perspective of a roast-beef roll embodying the invention. Fig. 2 is a plan, showing the method of forming the roll. Fig. 3 is a central transverse section. Fig. 4 is a transverse section of the finished roll.

The improved method consists in first trimming all suet, skin and arteries from the tenderloins 6; then placing them lengthwise together with the butts and thin ends alternating upon strings 7, as shown in Fig. 1; then scores about ½ inch deep and about 2 inches apart are cut lengthwise and from end to end in the tenderloins; then shaking a binder of flour over the surface of the tenderloins or spraying them with a suitable solution of sufficient stickiness to cause the tenderloins to adhere together; then placing strips 8 of beef fat about ⅜ths of an inch square in the scores and additional strips on the outside of the tenderloins; and then the ends of the strings 7 are tied together, so that tenderloins will be packed into a compact roll, as shown in Figs. 1 and 3. When the roll has been thus formed, it is ready for market, and may be sold as fresh meat for roasting or for the refrigerator, if it is to be stored.

These roasts, in desired number, can be packed in a box to suit convenience and will usually weigh from 12 to 20 pounds. A roast made up of small tenderloins will make a very delicious food and will provide an outlet for small tenderloins at a profitable margin, at a price that will not be much out of keeping with medium cuts of beef, and in a most inviting and appetizing form.

A characteristic of the roll is that it is substantially cylindrical and a slice cut from any portion thereof will contain portions of butts and points from a number of different tenderloins and the juices are retained in the roll. This has been found to be more desirable than when a single tenderloin is used and sliced crosswise in the usual manner.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. That improvement which consists in placing trimmed substantially whole tenderloins of beef lengthwise of one another in alternating relation so they will form a roll of substantially uniform thickness, scoring the tenderloins and placing fat therein, and fastening the tenderloins together into a compact roll.

2. A food roll of substantially uniform thickness consisting of a series of substantially whole trimmed tenderloins placed lengthwise of one another in alternating relation, strips of fat, and means for tying the tenderloins together into a compact roll.

JOHN F. WATERS.